United States Patent
Seethalakshmi et al.

(10) Patent No.: US 12,556,462 B2
(45) Date of Patent: Feb. 17, 2026

(54) MOBILITY-AS-A-SERVICE (MaaS) DATA SHARING THROUGH A DATASPACE CONNECTOR

(71) Applicant: SONY GROUP CORPORATION, Tokyo (JP)

(72) Inventors: Prashant Seethalakshmi, Bengaluru (IN); Srinivasa Pingili, Bengaluru (IN); Takashi Togame, Tokyo (JP); Sadayoshi Murao, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 2 days.

(21) Appl. No.: 18/810,628

(22) Filed: Aug. 21, 2024

(65) Prior Publication Data

US 2025/0080433 A1    Mar. 6, 2025

Related U.S. Application Data

(60) Provisional application No. 63/579,058, filed on Aug. 28, 2023.

(51) Int. Cl.
*H04L 41/5006* (2022.01)
*H04L 9/40* (2022.01)
*H04L 67/10* (2022.01)

(52) U.S. Cl.
CPC ......... *H04L 41/5006* (2013.01); *H04L 63/08* (2013.01); *H04L 67/10* (2013.01)

(58) Field of Classification Search
CPC ...... H04L 41/5006; H04L 63/08; H04L 67/10
See application file for complete search history.

(56) References Cited

U.S. PATENT DOCUMENTS

| | | | |
|---|---|---|---|
| 11,488,159 B1* | 11/2022 | Murao | G06Q 10/02 |
| 11,626,990 B1* | 4/2023 | Weber | H04L 9/3247 |
| | | | 713/178 |
| 12,401,643 B2* | 8/2025 | Seethalakshmi | H04L 63/20 |
| 12,432,708 B2* | 9/2025 | Raghavan | H04W 72/046 |
| 2019/0325436 A1* | 10/2019 | Cheng | H04L 9/3239 |
| 2021/0166188 A1* | 6/2021 | Enderby | G06Q 10/087 |
| 2022/0239668 A1* | 7/2022 | Liu | H04L 63/0227 |
| 2022/0277396 A1* | 9/2022 | Pariseau | G06Q 40/08 |
| 2025/0080433 A1* | 3/2025 | Seethalakshmi | H04L 63/08 |
| 2025/0293884 A1* | 9/2025 | Gilchrist | G06Q 20/3829 |

* cited by examiner

*Primary Examiner* — Dhairya A Patel
(74) *Attorney, Agent, or Firm* — CHIP LAW GROUP

(57) ABSTRACT

An electronic device for a mobility-as-a-service (MaaS) data sharing through a dataspace connector is disclosed. The electronic device receives an onboarding request from a first node of a MaaS network. The electronic device verifies a decentralized identity (DID) of the first node and transmits, to the first node, a set of parameters and a service agreement associated with the first node, based on the verified DID. The service agreement may be transmitted to a MaaS node group to generate a dataspace policy for a dataspace associated with the first node and the MaaS node group. Further, the electronic device receives the first information associated with the first node. The electronic device converts the first information into second information based on the dataspace policy and transmits the converted second information to the dataspace associated with the first node and the MaaS node group.

20 Claims, 6 Drawing Sheets

MOBILITY-AS-A-SERVICE (MaaS) DATA SHARING THROUGH A DATASPACE CONNECTOR

CROSS-REFERENCE TO RELATED APPLICATIONS/INCORPORATION BY REFERENCE

This Application also makes reference to U.S. Provisional Application Ser. No. 63/579,058, which was filed on Aug. 28, 2023. The above stated Patent Application is hereby incorporated herein by reference in its entirety.

FIELD

Various embodiments of the disclosure relate to a mobility-as-a-service (MaaS) platform. More specifically, various embodiments of the disclosure relate to an electronic device and a method for MaaS data sharing through a dataspace connector.

BACKGROUND

A mobility-as-a-service (MaaS) platform may be a digital platform that may be used to manage travel-related services. The MaaS platform may provide end-to-end travel services that may include various transportation modes, such as, public transport modes (such as, train, airplane, or bus), commercial transport services (such as, bike and car sharing and taxis) through a single digital platform. The MaaS platform may also provide payment services and transaction processing services for each journey (which may include multiple legs) managed by the MaaS platform. The MaaS platform may require a coordinated interaction between various entities (such as, multiple organizations or users) to provide the end-to-end travel services. For example, the various entities may provide transportation services, transaction processing services, payment services, and administrative (or logistic) services to enable the MaaS platform to operate and provide the end-to-end travel services to riders.

A MaaS platform typically uses a payment gateway that may allow the users to pay for their transportation services through a single account to handle multiple transactions. Various service agreements and privacy policies may be typically established between the MaaS platform and transport operators to ensure that journey options presented to the users do not skew due to underlying service agreements. The MaaS platform may need to handle various other tasks such as data management, user authentication, and customer support. A typical MaaS platform may not extend to industry specific standards for sharing of data. Also, it may be difficult to control information flow within the MaaS platform and out of the MaaS platform. Further, there may be a problem of missing data or problems such as, data ownership and data sovereignty concerns.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for mobility-as-a-service (MaaS) data sharing through a dataspace connector is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
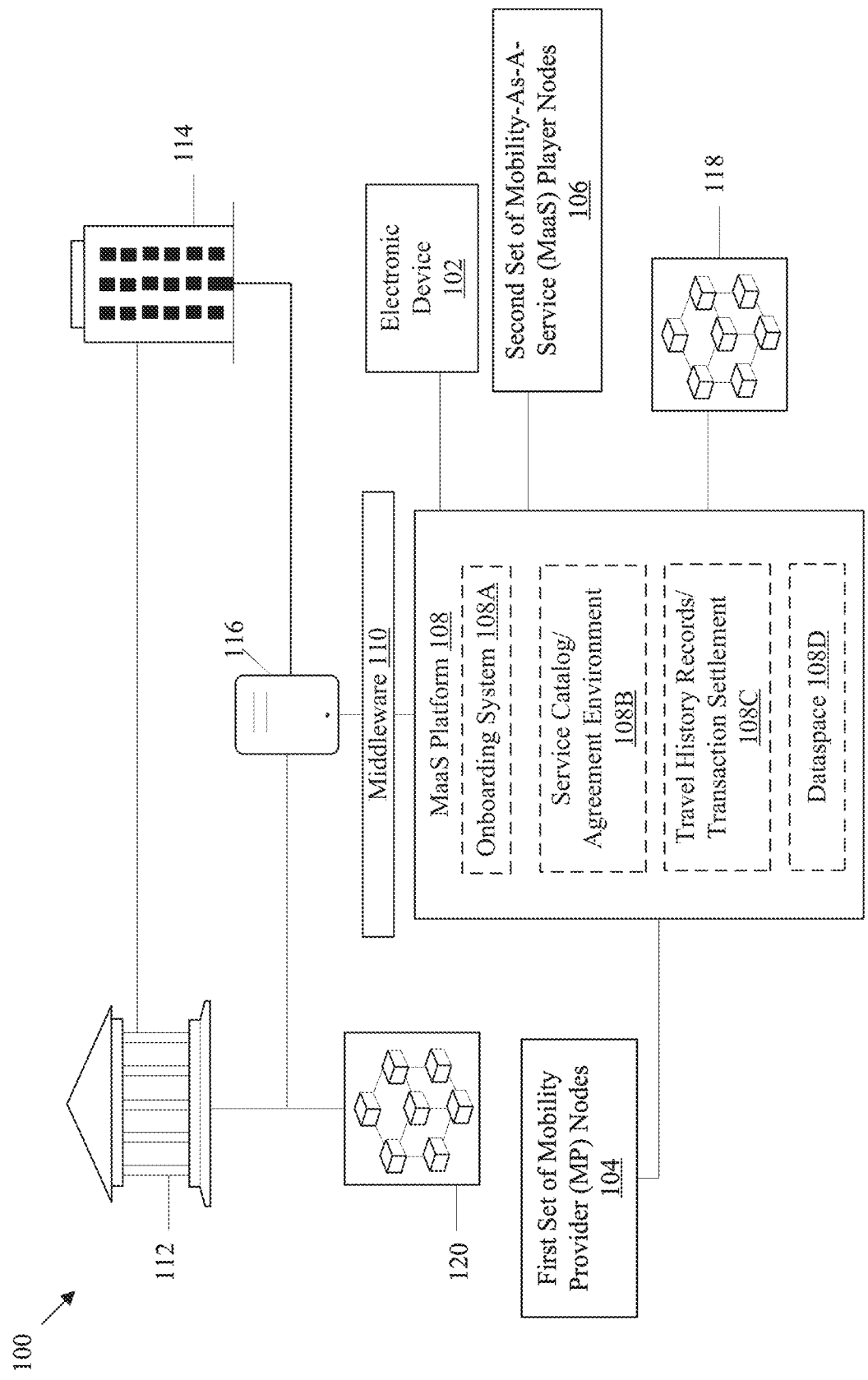
FIG. 1 is a block diagram that illustrates an exemplary network environment for MaaS data sharing through a dataspace connector, in accordance with an embodiment of the disclosure.

The following described implementations may be found in a disclosed electronic device and a method for a mobility-as-a-service (MaaS) data sharing through a dataspace connector. Exemplary aspects of the disclosure may provide an electronic device that may receive an onboarding request from a first node of a MaaS network. The received onboarding request may indicate a request to include the first node to a MaaS node group associated with the MaaS network. The MaaS network may include a set of nodes including one of a first set of Mobility Provider (MP) nodes and a second set of MaaS player nodes. The electronic device may verify a Decentralized Identity (DID) of the first node based on the received onboarding request. Thereafter, the electronic device may transmit, to the first node, a set of parameters and a service agreement associated with the first node, based on the verified DID. The service agreement associated with the first node may be transmitted to the MaaS node group to generate a dataspace policy for a dataspace associated with the first node and the MaaS node group, based on the transmitted service agreement associated with the first node. Further, the electronic device may receive first information associated with the first node. Thereafter, the electronic device may convert the received first information into second information based on the generated dataspace policy and may transmit the converted second information to the dataspace associated with the first node and the MaaS node group.

Typically, for a MaaS platform, there may be no streamlined process to onboard the various entities, such as, users, organizations, and personnel associated with organizations. The onboarding of a new user or a new organization to the MaaS platform may be cumbersome and time-consuming process that may require manual verification or authorization. For example, manual verification of the new users through email may be required. In such a case, the onboarding process may be an ad-hoc process. During the onboarding process, sensitive information (such as, name, email address, or organization name etc.) associated with the user, the organization, or the personnel associated with the organization may be available to third party administrators of the MaaS platform. The availability of such sensitive information to the third parties may give rise to confidentiality and privacy concerns. It may be difficult to control information flow within the MaaS platform and out of the MaaS platform. Further, there may be a problem of missing data or problems such as, data ownership and data sovereignty concerns. One of the main challenges of the MaaS platform may be the overwhelming amount of data that may be generated by the MaaS platform. The data generated by the MaaS platforms may include information about the user's travel patterns, payment details, and personal information, among others. This data can be used to improve the platform's services, but it can also be misused by third parties, leading to privacy concerns. For example, when a user subscribes to the MaaS platform that provides unlimited taxi and/or car-sharing usage, the cost incentive to use public transit is eliminated. This may lead to a situation where the user opts for private options like taxis over public transport, which could increase traffic congestion and carbon emissions. In addition, managing massive amounts of data can be a challenge. As the amount of data processed daily around the world is constantly increasing, traditional data centers may not be able to provide adequate storage capacity, which can lead to infrastructure issues.

The disclosed electronic device may receive an onboarding request from the first node of the MaaS network. The received onboarding request may indicate the request to include the first node to the MaaS node group associated with the MaaS network. The MaaS network may include the set of nodes including one of the first set of mobility provider nodes and the second set of MaaS player nodes. The electronic device may verify the DID of the first node based on the received onboarding request. Thereafter, the electronic device may transmit, to the first node, the set of parameters and the service agreement associated with the first node, based on the verified DID. The service agreement associated with the first node may be transmitted to the MaaS node group to generate the dataspace policy for the dataspace associated with the first node and the MaaS node group, based on the transmitted service agreement associated with the first node. Further, the electronic device may receive the first information associated with the first node. Next, the electronic device may convert the received first information into the second information based on the generated dataspace policy and may transmit the converted second information to the dataspace associated with the first node and the MaaS node group. Thus, the integrity of data may be preserved. The generated dataspace policy for the dataspace can regulate the data flow. Thus, a standardized framework for data sharing among multiple parties may be established.

FIG. 1 is a block diagram that illustrates an exemplary network environment for a MaaS data sharing through the dataspace connector, in accordance with an embodiment of the disclosure. With reference to FIG. 1, there is shown a block diagram of a network environment 100. The network environment 100 (such as, a mobility-as-a-service (MaaS) network 100) may include an electronic device 102, the first set of mobility provider nodes 104, a second set of MaaS player nodes 106, a mobility-as-a-service (MaaS) platform 108, a first distributed ledger database 118, and a middleware 110 (which may be layered software that interfaces the various components of the MaaS network 100). The MaaS network 100 may include a network of nodes, such as an issuer node 112, a set of holder nodes 114, a verifier node 116 and a second distributed ledger database 120. In an embodiment, the MaaS platform 108 may include an onboarding system 108A, a service catalog/agreement environment 108B, a system for travel history records/transaction settlement 108C, and a dataspace 108D. The issuer node 112 may be communicatively coupled to the set of holder nodes 114, the verifier node 116 and the second distributed ledger database 120. The set of holder nodes 114 may be communicatively coupled to the verifier node 116 and the issuer node 112. The verifier node 116 may be communicatively coupled to the issuer node 112, the set of holder nodes 114, the second distributed ledger database 120, and the middleware 110. The electronic device 102, the first set of mobility provider nodes 104, the second set of MaaS player nodes 106, the first distributed ledger database 118, and the middleware 110 may be communicatively coupled to the MaaS platform 108.

The electronic device 102 may include suitable logic, circuitry, interfaces, and/or code that may be configured to receive an onboarding request from a first node of the MaaS network 100. The received onboarding request may indicate a request to include the first node (for example, a computing device of a user, an organization, or personnel associated the organization) to a MaaS node group (e.g., a MaaS node group 302B of FIG. 3) associated with the MaaS network 100. The MaaS network 100 may include a set of nodes including one of the first set of MP nodes 104 and the second set of MaaS player nodes 106. The first set of MP nodes 104 and the second set of MaaS player nodes 106 may be communicatively associated with the MaaS platform 108. The MaaS platform 108 may include the onboarding system 108A, the service catalog or agreement environment 108B, the travel history records/transaction settlement 108C, the dataspace 108D. A Decentralized Identity (DID) of the first node may be verified based on the received onboarding request. The MaaS network 100 may include one of the issuer node 112 associated with a credential issuing authority, the set of holder nodes 114 corresponding to the set of nodes, the verifier node 116 associated with a MaaS network owner, and the second distributed ledger database 120. The onboarding request may be received at the verifier node 116. The DID may be used to verify the credentials of the first node, from which the request of onboarding is received. Based on the received onboarding request, the electronic device 102 may verify the DID of the first node. Based on the verified DID, the electronic device 102 may transmit a set of parameters and a service agreement associated with the first node, to the first node. Further, the electronic device 102 may transmit the service agreement may be performed associated with the first node to a MaaS node group (e.g., a MaaS node group 302B of FIG. 3). The DID of a node (e.g., the first node) may correspond to a unique identifier that may be used to verify a digital identity of the node using a decentralized approach. For example, the DID may include a unique machine ID of the node and a global or a local timestamp associated with the node. In an embodiment, the verification of the entity (e.g., the first node) of the MaaS network 100 through the DID of the entity may enable the entity to have a greater control over sensitive identification information of the entity. Based on the DID of the entity, the entity may be authenticated using a decentralized application of cryptographic techniques on the digital identity of the entity.

The first node may be onboarded to the created MaaS node group 302B of the MaaS network based on the received set of parameters and service agreement. The set of nodes may include one of the first set of MP nodes 104 and the second set of MaaS player nodes 106. Based on the received set of parameters and service agreement, the electronic device 102 may generate a dataspace policy for a dataspace (e.g., the dataspace 108D) associated with the first node and the MaaS node group 302B. The dataspace policy may be generated for the dataspace 108D associated with the first node based on the service agreement associated with the first node. The electronic device 102 may receive first information associated with the first node, from an entity, for example, the first node. The received information may be converted to the second information based on the generated dataspace policy. The first information received from the first node may be, for example, revenue sharing from history, record history, information related to a subscription, General Data Protection Regulation (GDPR) compliant user auth (authentication), roaming auth (authentication), and so on. The first information may be converted to the second information based on the generated dataspace policy.

The first set of MP nodes 104 may include suitable logic, circuitry, code, and/or interfaces that may be configured to store transaction records associated with a respective mobility provider. For example, the first set of MP nodes 104 may store transaction records associated with a first mobility provider. In an embodiment, each of the transaction records stored on each MP node may be associated with a two-party transaction. For example, the transaction records stored on an MP node of a certain mobility provider may be associated with transactions that may involve the mobility provider and a certain MaaS provider. The transaction records may include records of trips of users. Each trip may correspond to a mobility service that may be provided by the mobility provider in at least one leg of a journey of a rider who uses the mobility service. The first set of MP nodes 104 may be referred to as nodes of a distributed ledger (such as, the first distributed ledger database 118) that may store transaction records of the various mobility providers of the MaaS network 100. In an embodiment, each MP node may be implemented as, for example, one of an edge device, an edge node, or a distributed ledger node with a fog or cloud computing capability.

The MaaS network 100 may handle transactions (such as, transaction messages) for a MaaS mobility service associated with multiple mobility providers. In accordance with an embodiment, each of the first set of MP nodes 104 may be associated with a separate mobility provider of the MaaS network 100. The MaaS mobility service may be provided by homogeneous mobility providers (such as multiple cab ride provider companies or multiple rail companies) or heterogenous mobility providers through a homogenous group of devices, applications, or ticketing gates, or a heterogenous group of ticketing gates, applications, and Point of Sale (POS) devices. The MaaS mobility service may be a combination of individual service offerings of one or more homogenous or heterogeneous mobility providers. The MaaS mobility service may include, for example, a train service, a bus service, a taxi/cab service, a metro rail service, an air-plane service, a fleet service, a ride hailing service, a car sharing service, a carpool service, a car rental service, a bike sharing service, or a combination thereof.

The second set of MaaS player nodes 106 may include suitable logic, circuitry, code, and/or interfaces that may be configured to prepare a transportation route, which may include one or more mobility providers of the first set of MP nodes 104 based on a demand of a customer, such as, a rider who consumes a mobility service. The MaaS player may provide personalized services to customers on a single platform. The MaaS provider thus may have a function to aggregate transport services from many transport service operators (such as the mobility providers). The MaaS players may comprise one or more of commercial MaaS player, public transport provider, and a government organization. The MaaS players may further manage data associated with the users that may include storage of the data and to perform analytics on the data for optimization. The MaaS player of the second set of MaaS player nodes 106 may be categorized into two categories, based on role, which may include a MaaS integrator and a MaaS operator. The MaaS integrator may correspond to the role where the MaaS players assembles the transport services from multiple transport service providers that may include activities such as technical integration, contract management and financial clearing. The MaaS operator may correspond to the role where the MaaS player provides a MaaS service to end-users or customers through a single platform.

The MaaS platform 108 may include suitable logic, circuitry, code, and/or interfaces that may be configured to provide support for trip planning, ticketing, and payment services across multiple transportation providers (such as the mobility providers). The MaaS platform 108 may support mobile and web applications that may be accessed through user devices associated with users or customers. The MaaS platform 108 may collect, and store data associated with the users. The data associated the user may include, travel history, travel time, frequency of travel, and the like. Further, the MaaS platform 108 may analyze the data to optimize travel networks and calibrate supply and demand. The MaaS platform 108 may further include, the onboarding system 108A, the service catalog/agreement environment 108B, and a system for the travel history records/transaction settlement 108C. The onboarding system 108A may be used to integrate (such as, to onboard) or disintegrate (such as, to deboard) a node from the MaaS network 100. The onboarding system 108A may also be used to create (or disband) a MaaS node group (e.g., a MaaS node group 302B) from the set of nodes of the MaaS network 100.

The service catalog or agreement environment 108B may store and manage contracts and service agreements between different parties associated with the MaaS platform 108. For example, the service agreements may include first agreements between MP nodes, second agreements between MaaS player nodes, third agreements between MP nodes and MaaS player nodes, fourth agreements between the MaaS platform 108 and MP nodes (and/or MaaS player nodes), and fifth agreements between users, the MaaS platform 108, MP nodes, and/or MaaS player nodes.

The system for travel history records/transaction settlement 108C may be used to record and store data associated with user or nodes of the MaaS network 100. The data associated with user or nodes may include company information associated with a first MP, service item information associated with each of a first set of transaction records, ticket sales data associated with each of the first set of transaction records, fare price master data associated with the first MP, service price master data associated with the first MP, and/or ticket transaction data associated with each of the first set of transaction records. For example, the company information associated with the first MP may include a name, an address, a number of vehicles, and/or a type of vehicle, associated with a company corresponding to the first MP. The service item information associated with each of the first set of transaction records may include a date/time of a trip leg, a duration of the trip leg (based on get-in/get-out transaction messages), a distance travelled on the trip leg, and/or a type of vehicle associated with the trip leg, associated with each of the first set of transaction records. The ticket sales data associated with each of the first set of transaction records may include the price of a ticket for the trip, and/or a price of the trip leg associated with the first MP, associated with each of the first set of transaction records. The fare price master data associated with the first MP may include a trip-leg distance-based fare table, and/or a trip-leg duration-based fare table associated with the first MP. The service price master data associated with the first MP may include a traffic surcharge, a wait-time surcharge, a trip-leg duration surcharge, a day-of-week based surcharge, a time-of-day based surcharge, a holiday surcharge, and/or a service tax, associated with the first MP. The ticket transaction data associated with each of the first set of transaction records may include, but is not limited to, transaction data corresponding to a trip-leg associated with the first MP, from ticket data in each of the first set of transaction records.

The dataspace 108D may store usage policies, a set of conditions governing transmission of data between nodes associated with the dataspace 108D, and various available resources. For example, the dataspace 108D may correspond to an International Data Space Association (IDSA) dataspace, a mobility dataspace, an automotive network dataspace, a Catena-X dataspace, a Gaia-X dataspace and the like. The dataspace 108D may be hosted by a dataspace connector (e.g., a MaaS dataspace connector) on the MaaS platform 108 and/or the electronic device 102. The MaaS dataspace connector may connect the dataspace 108D with the MaaS platform 108 and the electronic device 102. Based on the usage policies and the set of conditions, the integrity of data may be preserved, and the generated dataspace policy for the dataspace 108D may be used to regulate the data flow. Thus, a standardized framework for data sharing among multiple parties may be established based on the dataspace 108D. The dataspace is further explained, for example, in FIG. 2, FIG. 3, and FIG. 4. Details related to the MaaS dataspace connector are described further, for example, in FIG. 5.

The middleware 110 may include suitable logic, circuitry, code, and/or interfaces that may be configured to enable communication and message passing between various software applications, databases, application programming interfaces, and other remote or local application components. Examples of the middleware 110 may include, but are not limited to, a database middleware, an application server middleware, message-oriented middleware, transaction-processing middleware, and web middleware.

The issuer node 112 may include suitable logic, circuitry, code, and/or interfaces that may be configured to generate credentials associated with each holder node of the set of holder nodes 114. The generated credentials may correspond to a set of attributes including at least one of an organization name, an organization ID, a name and electronic-mail ID of an administrator user, a role of a user of a node, or a user privilege level associated with a user of a node. The issuer node 112 may be associated with a government organization or a private organization. The issuer node 112 may define a credential template. The credential template may further include certain attributes, for example, ID of organization, organization name, admin username (such as the personnel associated with the organization), email address of admin, role, and responsibility of the admin. In an example, the issuer node 112 may manage a creation of digital identities of the set of holder nodes 114 and an authorization of the set of holder nodes 114 to the MaaS platform 108.

The set of holder nodes 114 may include suitable logic, circuitry, code, and/or interfaces that may be configured to participate as nodes in the MaaS network 100 and be communicatively coupled to the MaaS platform 108. Each of the set of holder nodes 114 may receive credential information associated with the corresponding holder node from the issuer node 112. The received credential information may correspond to a digital identification of the holder node. The holder node may transmit an onboarding request to the electronic device 102, to onboard the holder node to the MaaS network 100. The onboarding request of the holder node may be authenticated by the verifier node 116 based on the credential information of holder node. The onboarding of the holder node to the MaaS network 100 may enable the holder node to join the MaaS network 100 and communicate with the MaaS platform 108 and the other holder nodes of the set of holder nodes 114. In an example, the set of holder nodes 114 may correspond to a mobility provider node or a MaaS player node.

The verifier node 116 may include suitable logic, circuitry, code, and/or interfaces that may be configured to receive a credential verification request associated with a first node (of a set of nodes of the MaaS network 100), based on an onboarding request associated with the first node. Further, the verifier node 116 may query a holder node (such as, a holder node associated with the same mobility provider or MaaS player as that of the first node) of the set of holder nodes 114 for verified credentials of the first node, based on the received credential verification request. Further, the verifier node 116 may receive, from the holder node, the verified credentials of the first node, based on the query. The DID of the first node may be verified based on the received verified credentials of the first node. Once the verification is completed, the first node may be onboarded. In an example, the verifier node 116 may be associated with a governing organization or administrator of the MaaS network 100.

In an embodiment, each of the issuer node 112, the set of holder nodes 114, and the verifier node 116 may be associated with the distributed ledger database (e.g., the second distributed ledger database 120) and may include a corresponding DID agent. For example, the DID agent may correspond to a local agent hosted on a node (e.g., the issuer node 112, the set of holder nodes 114, and the verifier node 116). In another example, the DID agent may correspond to a cloud agent communicatively coupled to the node, such as, the issuer node 112, the set of holder nodes 114, and the verifier node 116. The DID agent may perform DID-based communications and may be used to verify the DID associated with the first node based on credential information of the first node or a user of the first node stored on the second distributed ledger database 120.

In an embodiment, the first distributed ledger database 118 may be configured store transaction records associated with a MaaS mobility service. The first distributed ledger database 118 may correspond to a blockchain common database associated with the MaaS mobility service. The transaction records associated with the MaaS mobility service may be included in a set of state objects, such as an initial state object and an updated version of the initial state object. In an embodiment, the second distributed ledger database 120 may be configured to store credential information associated with nodes of the MaaS network 100. The stored credential information may be used for decentralized identification (DID) based verification or authentication of the nodes. The second distributed ledger database 120 may correspond to a decentralized identification (DID) blockchain database associated with the MaaS network 100. Each state object and/or credential information may correspond to a smart contract, a contract code (or rules of a transaction upon which parties to the transaction agree), and state properties (that may be updated when the transaction records and/or credential information may be updated based on transaction messages from the publisher node and/or credential creation by an issuer node). By way of example, and not limitation, at least one of the first distributed ledger database 118 and the second distributed ledger database 120 may be a Corda blockchain, an Ethereum blockchain, or a Hyperledger blockchain. For example, U.S. patent application Ser. No. 17/178,185 filed on Feb. 17, 2021, discloses details related to a distributed ledger database (such as, the first distributed ledger database 118 and the second distributed ledger database 120). In another example, at least one of the first distributed ledger database 118 and the second distributed ledger database 120 may correspond to a non-blockchain-based distributed ledger, for example, a Hashgraph ledger or an Iota Tangle ledger. In an example, both Iota and Hashgraph ledgers may be implemented using a Directed Acyclic Graph (DAG) data structure instead of a blockchain data structure.

The electronic device 102 may generate a set of service and agreement templates based on the received set of onboarding agreements to create a MaaS node group (e.g., a MaaS node group 302B of FIG. 3) corresponding to the set of nodes. The electronic device 102 may transmit the received set of onboarding agreements and the generated set of service and agreement templates to the created MaaS node group 302B.

In operation, the electronic device 102 may be configured to receive the onboarding request from the first node of the MaaS network 100. The received onboarding request may indicate a request to include the first node (e.g., a node of the first set of MP nodes 104) to the MaaS node group 302B associated with the MaaS network 100. The MaaS network 100 may include a set of nodes including at least one of a first set of mobility provider nodes (e.g., the first set of MP nodes 104) and a second set of MaaS player nodes (e.g., the second set of MaaS player nodes 106). The first set of MP nodes 104 and the second set of MaaS player nodes 106 may be communicatively associated with the MaaS platform 108. The decentralized identity (DID) of the first node may be verified based on the received onboarding request. The MaaS network 100 may include at least one of the issuer node 112 associated with the credential issuing authority, the set of holder nodes 114 corresponding to the set of nodes, the verifier node 116 associated with a MaaS network owner, and the second distributed ledger database 120. The onboarding request may be received at the verifier node 116. The DID may be used to verify the credentials of the first node, from which the request of onboarding is received. Based on the received onboarding request, the electronic device 102 may verify a decentralized identity (DID) of the first node. Based on the verified DID, the electronic device 102 may transmit a set of parameters and a service agreement associated with the first node, to the first node. Further, the electronic device 102 may transmit the service agreement associated with the first node to the MaaS node group 302B. For example, the DID may include a unique machine ID of the node and a global or a local timestamp associated with the node. Based on the DID of the entity, the entity may be authenticated using a decentralized application of cryptographic techniques on the digital identity of the entity.

The first node may be onboarded to the created MaaS node group 302B of the MaaS network based on the received set of parameters and service agreement. The set of nodes may include at least one of the first set of MP nodes 104 and the second set of MaaS player nodes 106. Based on the received set of parameters and service agreement, the electronic device 102 may generate a dataspace policy for the dataspace 108D associated with the first node and the MaaS node group 302B. The dataspace policy may be generated for the dataspace 108D associated with the first node based on the service agreement associated with the first node. The electronic device 102 may receive the first information associated with the first node. The received information may be converted to the second information based on the generated dataspace policy. The first information received from the first node may be for example revenue sharing from history, record history, information related to a subscription, General Data Protection Regulation (GDPR) compliant user auth (authentication), roaming auth (authentication), and so on. The first information may be converted to the second information based on the generated dataspace policy. The onboarding of the first node to the MaaS network is described further, for example, in FIG. 2 FIG. 3, and FIG. 4. The onboarding agreements may include for example a master service agreement, terms-of-service agreement, or privacy policy agreement.

Typically, there may be processes to store data policies and manage the flow of data. As such, a storage of various data, for example, the onboarding agreements and set of service and agreement templates can be cumbersome and may require manual verification or authorization of the dataflow. For example, a user or a first node may request the first information and indicate that for each communication between the first node and the MaaS network, the usage policies be audited. In an embodiment, the first information associated with the first node may be converted to the second information based on the generated dataspace policy and may be transmitted to the dataspace 108D associated with the first node and the MaaS node group 302B. The dataspace policy may be generated for the dataspace 108D associated with the first nod and the MaaS node group 302B, based on the transmitted service agreement associated with the first node. For example, the generated set of parameters and service agreement may be skeletal formats that may be generated for certain service agreements, usage policies etc. For example, if two organizations want to establish a revenue share service, they may have to establish a service agreement between them for revenue sharing. The integrity of data may thereby be preserved and the generated dataspace policy for the dataspace may be used to regulate the data flow. Thus, a standardized framework for data sharing among multiple parties may be established.

Figure 2:
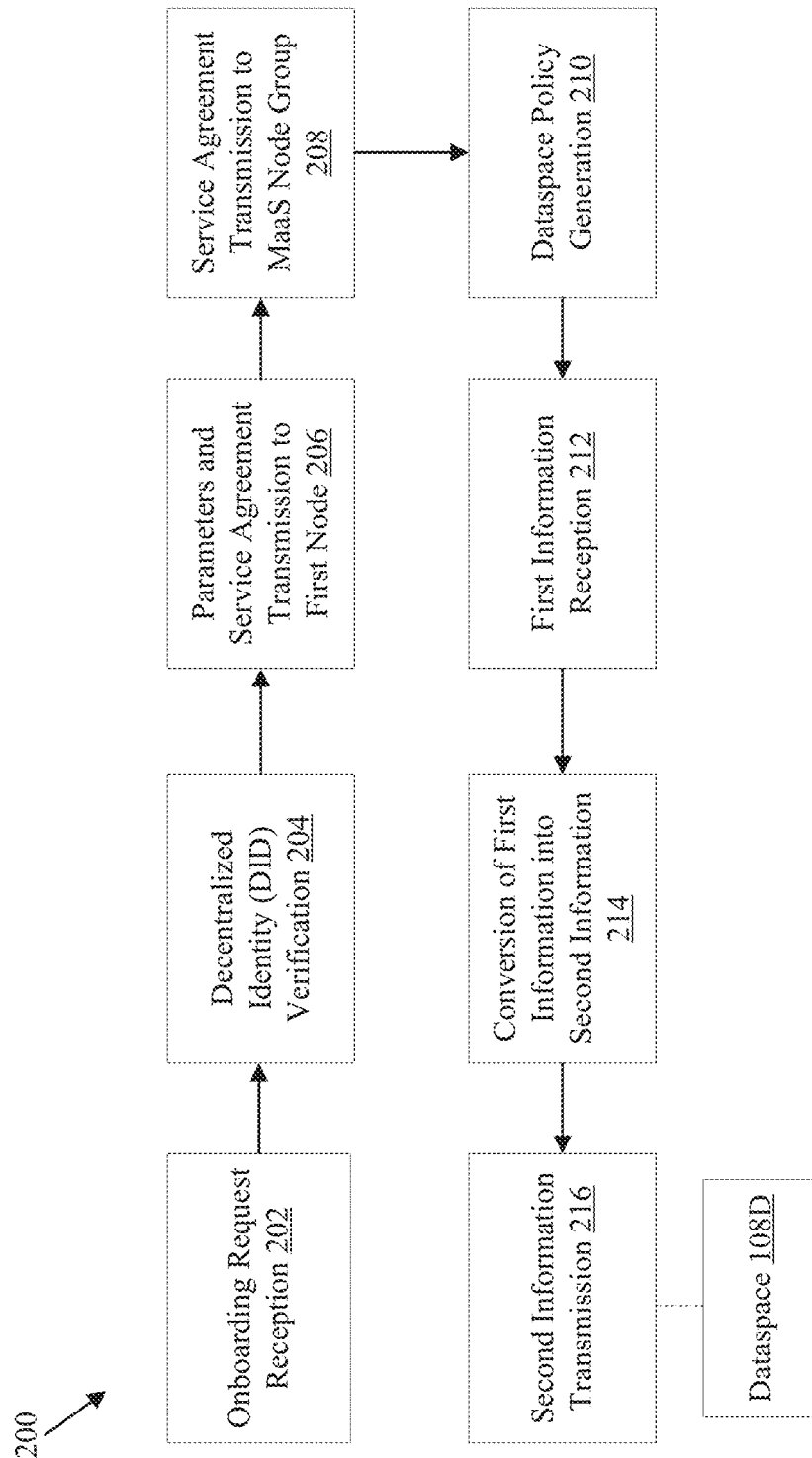
FIG. 2 is a processing pipeline diagram that illustrates MaaS data sharing through a dataspace connector, in accordance with an embodiment of the disclosure.

FIG. 2 is a processing pipeline diagram that illustrates MaaS data sharing through a dataspace connector, in accordance with an embodiment of the disclosure. FIG. 2 is explained in conjunction with elements from FIG. 1. With reference to FIG. 2, there is shown an exemplary processing pipeline 200 that illustrates exemplary operations from 202 to 216 for implementation of MaaS data sharing through dataspace connector. The exemplary operations 202 to 216 may be executed by any computing system, for example, by the electronic device 102 of FIG. 1.

At 202, an onboarding request may be received from the first node of the MaaS network. The electronic device 102 may be configured to receive the onboarding request from the first node of the MaaS network 100. The onboarding request may indicate a request to include the first node to a MaaS node group (e.g., a MaaS node group 302B of FIG. 3) associated with the MaaS network 100. The MaaS network 100 may include the set of nodes including one of the first set of mobility provider nodes 104 and the second set of MaaS player nodes 106. For example, the first set of MP nodes 104 (such as, a node for a train service, a bus service, a taxi/cab service, a metro rail service etc.) may be integrated or interfaced with the MaaS platform 108. The first set of MP nodes 104 and the second set of MaaS player nodes 106 may be onboarded with the MaaS platform 108 based on the dataspace policy for the dataspace 108D associated with the first node and the MaaS node group 302B.

At 204, the DID of the first node may be verified based on the received onboarding request. The electronic device 102 may be configured to verify the decentralized identity (DID) of the first node based on the received onboarding request. The DID of the first node may be verified based on the received verified credentials of the first node. The verifier node 116 may receive a credential verification request (e.g., from the electronic device 102) associated with the first node based on the onboarding request associated with the first node. Further, the verifier node 116 may query a holder node (such as, a holder node associated with the same mobility provider or MaaS player as that of the first node) of the set of holder nodes 114 for verified credentials of the first node, based on the received credential verification request. Further, the verifier node 116 may receive, from the holder node, the verified credentials of the first node, based on the query. The DID of the first node may be verified based on the received verified credentials of the first node. Further, based on the verification of the first node, the first node may be onboarded to the created MaaS node group 302B of the MaaS network 100. Further, based on the verification of the first node, the first node may be onboarded to the created MaaS node group 302B of the MaaS network 100.

In an embodiment, the electronic device 102 may further be configured to create a user profile and a role for the user profile, associated with the first node in the MaaS network 100. The creation of the user profile and the role may be based on the verified DID of the first node. 302B The issuer node 112 may be associated with a government organization or a private organization. The issuer node 112 may define a credential template. The credential template may further include certain attributes, for example, ID of organization, organization name, admin username (such as the personnel associated with the organization), email address of admin, role, and responsibility of the admin. In an example, the issuer node 112 may manage a creation of digital identities of the set of holder nodes 114 and an authorization of the set of holder nodes 114 to the MaaS platform 108.

A scheduler may include suitable logic, circuitry, interfaces, and/or code that may be configured to generate a trigger event associated with creation of the user profile and assignment of the role. In an embodiment, the trigger event may include verification of credentials of the first node. Examples of the scheduler may include, but are not limited to, a smartphone, a cellular phone, a mobile phone, a mainframe machine, a server, a computer workstation, and/or any computing device with a schedule-based or an event-based triggering mechanism. In an embodiment, the electronic device 102 may further be configured to create a user profile and a role for the user profile, associated with the first node in the MaaS network 100. The creation of the user profile and the role may be based on the verified DID of the first node and the scheduler.

At 206, the set of parameters and service agreement may be transmitted to the first node based on the verified DID. The electronic device 102 may be configured to transmit, to the first node, a set of parameters and a service agreement associated with the first node, based on the verified DID. For example, the set of parameters and agreement templates may be skeletal formats that may be generated for certain service agreements etc. For example, if two organizations want to establish a revenue share service, they may have to establish a service agreement between them for revenue sharing. The set of service agreements may be for example, a master service agreement, a terms-of-service agreement, or a privacy policy agreement. For example, the service agreement may correspond to contract or agreement between two parties, such as, the first MaaS player node and the first mobility provider node, for MaaS services to be offered and a revenue sharing arrangement between the two parties.

At 208, the service agreement associated with the first node may be transmitted to a MaaS node group 302B. The electronic device 102 may be configured to transmit the service agreement associated with the first node to a MaaS node group (e.g., a MaaS node group 302B of FIG. 3). The electronic device 102 may create the MaaS node group 302B (for example, one or more nodes from the first set of MP nodes 104 and/or the second set of MaaS player nodes 106) from the set of nodes of the MaaS network 100. Based on the transmission, to the first node, of the set of parameters and the service agreement associated with the first node, the electronic device 102 may transmit the service agreement associated with the first node to each node of the MaaS node group 302B.

At 210, the dataspace policy for the dataspace associated with the first node and the MaaS node group 302B may be generated, based on the transmitted service agreement associated with the first node. The electronic device 102 may be configured to generate the dataspace policy for the dataspace 108D associated with the first node and the MaaS node group 302B, based on the transmitted service agreement associated with the first node. The dataspace policy may govern data usage and storage for information associated with the dataspace 108D. The dataspace policy may be based on a region or area of operation of a first MP, a first MaaS player, and/or a first MaaS network as a whole. The dataspace policy may also be dependent on one or more legal requirements of the region or area, which may change from time-to-time. In addition, data retention and processing rules may be governed by fine-grained parameters in a service agreement. Examples of the set of parameters may include data retention period, data analytics policy, a policy for data disclosure to third parties, treatment of personally identifiable information (PII), data hashing, and the like. The dataspace 108D may be used for storing policies associated with any of the record history, the information related to the subscription, the system for revenue sharing from history, the system for GDPR compliant user auth, the system for roaming auth, and the system for real-time analysis and recommendation.

At 212, the first information associated with the first node may be received. The electronic device 102 may be configured to receive first information associated with the first node. The first information may be either received from the first node itself or from another node of the MaaS node group 302B.

At 214, the first information may be converted into the second information based on the generated dataspace policy. The electronic device 102 may be configured to convert the first information into the second information, based on the generated dataspace policy. The dataspace policy for the dataspace 108D associated with the first node and the MaaS node group 302B may indicate one of a type of data to be transmitted to the dataspace 108D or a set of conditions that may govern a transmission of data between nodes associated with the dataspace. The dataspace policy may also be dependent on one or more legal requirements of the region or area, which may change from time-to-time. In addition, data retention and processing rules may be governed by fine-grained parameters in a service agreement. Examples of the fine-grained parameters may include data retention period, data analytics policy, a policy for data disclosure to third parties, treatment of personally identifiable information (PII), data hashing, and the like. In an embodiment, the electronic device 102 may receive base-level details for the service agreement associated with the first node. For example, the base-level details may include a name of a contracting entity, an address of a contracting entity, and other related basic details of the contracting entity (e.g., the first node) The catalog information and offer information may be generated based on the received base-level details. A resource definition associated with the dataspace 108D may be generated based on the generated mapping and the generated dataspace policy for the dataspace 108D.

In an embodiment, service catalog/agreement may include a set of service and agreement templates. In an embodiment, a node may generate contracts or agreements or catalog information, such as, a master service agreement (MSA) contract, terms of service (ToS) agreement, or a privacy policy (PP) agreement based on the storage of the set of service and agreement templates. For example, the generated set of service and agreement templates may be skeletal formats that may be generated for certain service agreements etc. For example, if two organizations want to establish a revenue share service, they may have to establish a service agreement between them for revenue sharing.

The electronic device 102 may be configured to generate artefacts associated with the generated resource definition, based on the received first information. The generated artefacts associated with the generated resource definition may correspond to the converted second information. The generated artefacts may be transmitted to the dataspace 108D. The set of usage policies associated with the dataspace 108D may be determined based on base-level details for the service agreement associated with the first node, received by the electronic device 102. The service agreement associated with the first node may be generated, based on the received base-level details and the determined set of usage policies. The usage policy may be created for the dataspace 108D based on the generated service agreement associated with the first node. A mapping may be generated between the generated service agreement associated with the first node and the created usage policy for the dataspace 108D. The created usage policy and the generated mapping may be transmitted to the dataspace 108D. The dataspace policy for the dataspace 108D may correspond to the transmitted usage policy and the transmitted mapping.

In an embodiment, the electronic device 102 may be configured to establish a connection with a metadata broker associated with the MaaS network 100. The electronic device 102 may transmit third information to the metadata broker, based on the established connection The third information may be indicative of resources available through the dataspace 108D and fourth information indicative of the usage policy of the dataspace 108D. Further, the electronic device 102 may transmit, to the metadata broker, a uniform resource identifier associated with each resource of the resources available through the dataspace 108D. The resources may be accessible through the URI. The electronic device 102 may be configured to receive an access request for a resource of resources available through the dataspace 108D to determine a uniform resource identifier (URI) associated with the resource requested in the received access request. The electronic device 102 may determine whether an access to the determined URI conforms to the usage policy associated with the dataspace 108D. The electronic device 102 may be configured to transmit the determined URI associated with the resource requested in the received access request is transmitted, based on the determination that the access to the determined URI conforms to the usage policy associated with the dataspace 108D. The electronic device 102 may be configured to render the determined URI as inaccessible based on the determination that the access to the determined URI is non-conformant to the usage policy associated with the dataspace 108D.

At 216, the second information may be transmitted. The electronic device 102 may be configured to transmit the second information (converted from the received first information) to the dataspace 108D associated with the first node and the MaaS node group.

Figure 3:
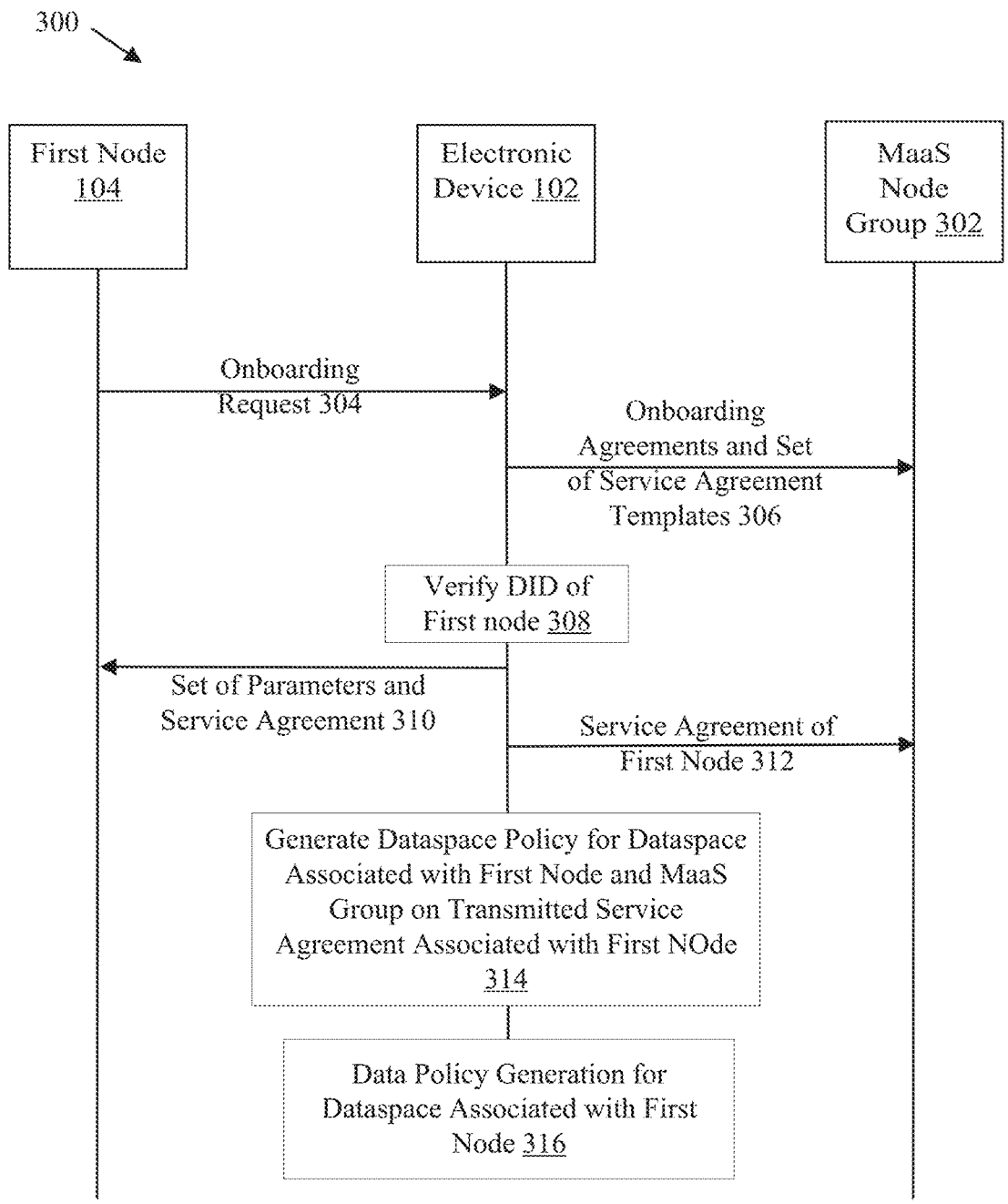
FIG. 3 illustrates an exemplary sequence diagram of data policy generation for a dataspace associated with a first node, in accordance with an embodiment of the disclosure.

FIG. 3 illustrates an exemplary sequence diagram of data policy generation for a dataspace associated with a first node, in accordance with an embodiment of the disclosure. FIG. 3 is explained in conjunction with elements from FIGS. 1 and 2. With reference to FIG. 3, there is shown a sequence diagram 300 that illustrates a sequence of operations from 304 to 314. The sequence of operations may be executed by various nodes of the MaaS network 100 (such as, a first node 302A, MaaS node group 302B of FIG. 3, and the electronic device 102 of FIG. 1).

At 304, an onboarding request may be received by the electronic device 102. The electronic device 102 may be configured to receive the onboarding request from the first node of the MaaS network 100. The received onboarding request may indicate a request to include the first node 302A to the MaaS node group 302B associated with the MaaS network 100. The MaaS network 100 may include a set of nodes including the first set of mobility provider nodes 104 and the second set of MaaS player nodes 106.

At 306, an onboarding agreement and a set of service agreement templates may be transmitted to the MaaS node group 302B. The electronic device 102 may be configured to transmit the onboarding agreement and the set of service agreement templates to the MaaS node group 302B. Prior to transmission of the onboarding agreement and the set of service agreement templates to the MaaS node group 302B, the electronic device 102 may be configured to create the MaaS node group 302B from a set of nodes of the MaaS network 100. For example, the MaaS node group 302B may correspond to nodes that may be governed by a common policy/agreement, such as a revenue sharing agreement, a licensing agreement, a service management/delivery agreement, or a portability agreement. As an example, the MaaS node group 302B may include two MP nodes and a certain MaaS player node such that the two MP nodes may be associated with the particular MaaS player node.

The onboarding agreement and the set of service agreement templates may be transmitted, based on the created MaaS node group 302B. For example, the onboarding agreement and the set of service agreement templates may be skeletal formats that may be generated for certain service agreements etc. For example, if two organizations want to establish a revenue share service, they may have to establish a service agreement between them for revenue sharing. The set of service agreements may be for example, a master service agreement, a terms-of-service agreement, or a privacy policy agreement. In an embodiment, the agreement template may be generated by a MaaS community (associated with the MaaS node group 302B, for example). The received service agreement and privacy policy may be used by the MaaS community (associated with the MaaS node group 302B, for example) to generate templatized service agreements, such as, service agreements for revenue sharing and service agreements associated with various subscription models.

In certain cases, the MaaS node group 302B may be already created, based on receipt of onboarding request of another node (apart from the first node). In such a case, the MaaS node group 302B may not be required to be created again. Also, as the MaaS node group 302B already existed, the operation (i.e., the operation 306) of the transmission of the onboarding agreement and the set of service agreement templates may be omitted.

At 308, the DID of the first node 302A may be verified. The electronic device 102 may be configured to verify the DID of the first node 302A, based on the received onboarding request. For example, the electronic device 102 may transmit a request (i.e., a credential verification request) to verify the DID of the first node 302A to the verifier node 116. The verifier node 116 may receive the credential verification request associated with the first node 302A, based on the received onboarding request of the first node 302A. A holder node of the set of holder nodes 114 may be queried for verified credentials of the first node 302A, based on the received credential verification request. The verified credentials of the first node 302A may be received from the holder node, based on the query. The DID of the first node 302A may be verified based on the received verified credentials of the first node 302A. The user and the role of the user may be created, associated with the first node in the MaaS network 100. The creation of the user and the role may be based on the verified DID of the first node and the scheduler.

At 310, a set of parameters and service agreements may be received at the first node 302A. The electronic device 102 may be configured to transmit, to the first node 302A, the set of parameters and the service agreements associated with the first node 302A, based on the verified DID. For example, the set of parameters and agreement templates may be skeletal formats that may be generated for certain service agreements etc. For example, if two organizations want to establish a revenue share service, they may have to establish a service agreement between them for revenue sharing. The set of service agreements may be for example, a master service agreement, a terms-of-service agreement, or a privacy policy agreement. For example, the service agreement may correspond to contract or agreement between two parties, such as, the first MaaS player node and the first mobility provider node, for MaaS services to be offered and a revenue sharing arrangement between the two parties.

At 312, the service agreement of the first node 302A is received at the MaaS node group 302B. The electronic device 102 may be configured to transmit the service agreement of the first node 302A to the MaaS node group 302B, based on the transmission of the set of parameters and the service agreement associated with the first node 302A, to the first node 302A.

At 314, the dataspace policy may be generated for the dataspace 108D associated with the first node 302A and the MaaS node group 302B, based on transmitted service agreement associated with the first node 302A. The electronic device 102 may be configured to generate the dataspace policy for the dataspace 108D associated with the first node 302A and the MaaS node group 302B, based on the transmitted service agreement associated with the first node 302A. The dataspace policy may govern data usage and storage for information associated with the dataspace 108D. The dataspace policy may be based on a region or area of operation of a first MP, a first MaaS player, and/or a first MaaS network as a whole. The dataspace policy may also be dependent on one or more legal requirements of the region or area, which may change from time-to-time. In addition, data retention and processing rules may be governed by fine-grained parameters in a service agreement. Examples of the set of parameters may include data retention period, data analytics policy, a policy for data disclosure to third parties, treatment of personally identifiable information (PII), data hashing, and the like. The dataspace 108D may be used for storing policies associated with any of the record history, the information related to the subscription, the system for revenue sharing from history, the system for GDPR compliant user auth, the system for roaming auth, and the system for real-time analysis and recommendation.

Figure 4:
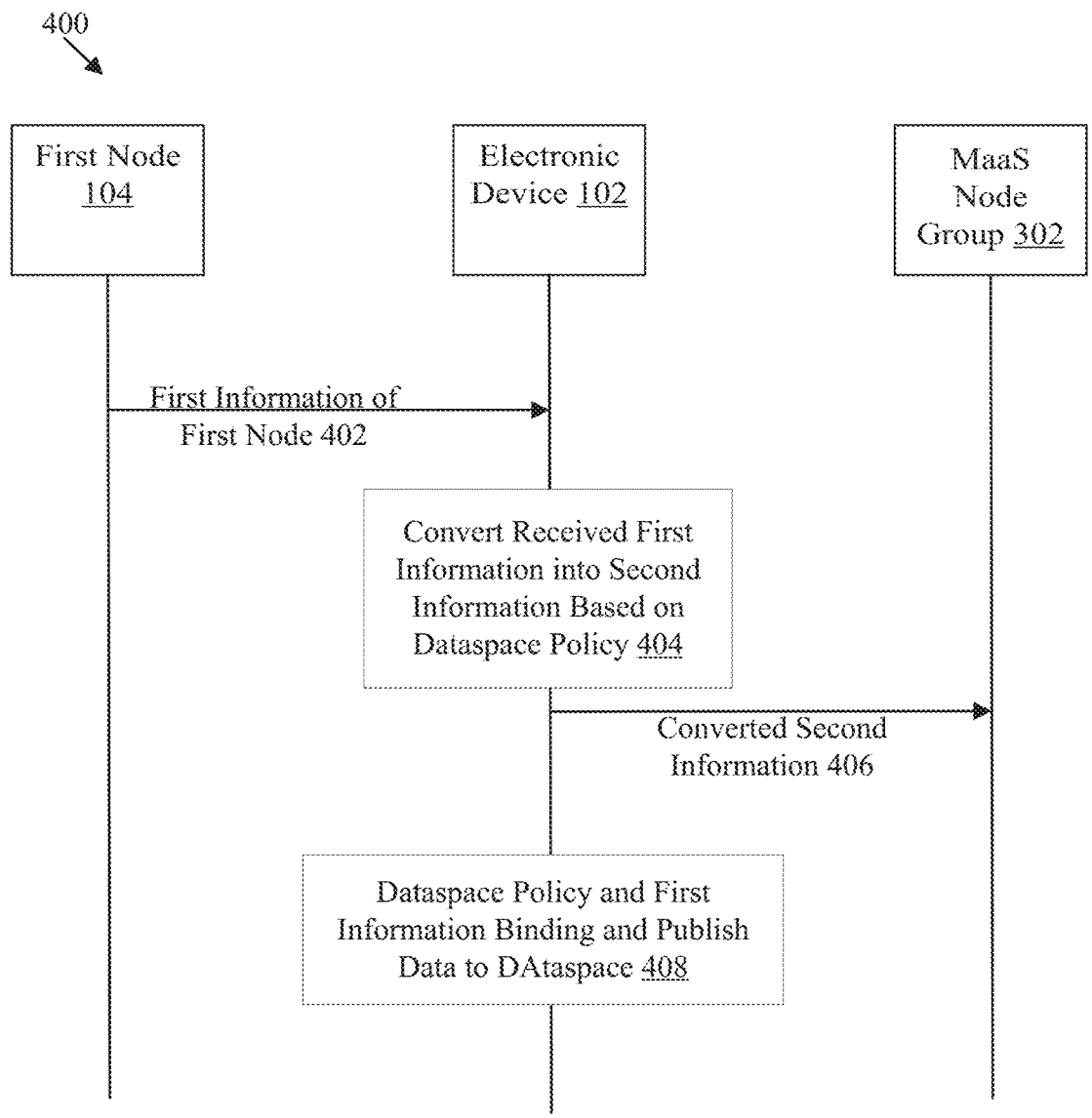
FIG. 4 is an exemplary sequence diagram that illustrates dataspace policy, first information binding, and publishing data to a dataspace, in accordance with an embodiment of the disclosure.

FIG. 4 is an exemplary sequence diagram that illustrates dataspace policy, first information binding, and publishing data to a dataspace, in accordance with an embodiment of the disclosure. FIG. 4 is explained in conjunction with elements from FIG. 1, FIG. 2, and FIG. 3. With reference to FIG. 4, there is shown a sequence diagram 400 that illustrates a sequence of operations 402 and 408. The sequence of operations may be executed by various nodes of the MaaS network 100 (such as, a first node 302A, MaaS node group 302B of FIG. 3, and the electronic device 102 of FIG. 1).

At 402, the first information associated with the first node 302A may be received. The electronic device 102 may be configured to receive the first information associated with the first node 302A. The first information may either be received directly from the first node 302A itself or may be received from another node of the set of nodes of the MaaS network 100 (including, for example, the MaaS node group 302B). The first node 302A may be onboarded to the created MaaS node group 302B of the MaaS network 100 based on the received set of parameters and service agreement, as described, for example, in FIG. 2 and FIG. 3. The MaaS network 100 may include a set of nodes including at least one of the first set of MP nodes 104 and the second set of MaaS player nodes 106. Based on the received set of parameters and service agreement, the electronic device 102 may generate the dataspace policy for the dataspace 108D associated with the first node 302A and the MaaS node group 302B. The dataspace policy may be generated for the dataspace 108D associated with the first node 302A based on the service agreement associated with the first node 302A. On receipt of the first information associated with the first node 302A (from the first node 302A, for example), the electronic device 102 may convert the received first information to the second information, based on the generated dataspace policy. The first information received from the first node may include details related to, for example, revenue sharing from history, record history, information related to a subscription, General Data Protection Regulation (GDPR) compliant user auth (authentication), roaming auth (authentication), and so on.

At 404, the first information may be converted to the second information. The electronic device 102 may be configured to convert the received first information to the second information. The first information may be converted to the second information based on the generated dataspace policy. The onboarding of the first node to the MaaS network is described further, for example, in FIGS. 2, and 3. The onboarding agreements may include for example a master service agreement, terms-of-service agreement, or privacy policy agreement.

The dataspace policy for the dataspace 108D associated with the first node 302A and the MaaS node group 302B may indicate one of a type of data to be transmitted to the dataspace 108D or a set of conditions that may govern a transmission of data between nodes associated with the dataspace. The dataspace policy may also be dependent on one or more legal requirements of the region or area, which may change from time-to-time. In addition, data retention and processing rules may be governed by fine-grained parameters in a service agreement. Examples of the fine-grained parameters may include data retention period, data analytics policy, a policy for data disclosure to third parties, treatment of personally identifiable information (PII), data hashing, and the like. In an embodiment, the electronic device 102 may receive base-level details for the service agreement associated with the first node. The catalog information and offer information may be generated based on the received base-level details. A resource definition associated with the dataspace 108D may be generated based on the generated mapping and the generated dataspace policy for the dataspace 108D.

In an embodiment, service catalog/agreement may include a set of service and agreement templates. In an embodiment, a node may generate contracts or agreements or catalog information, such as, a master service agreement (MSA) contract, terms of service (ToS) agreement, or a privacy policy (PP) agreement based on the storage of the set of service and agreement templates. For example, the generated set of service and agreement templates may be skeletal formats that may be generated for certain service agreements etc. For example, if two organizations want to establish a revenue share service, they may have to establish a service agreement between them for revenue sharing.

The electronic device 102 may be configured to generate artefacts associated with the generated resource definition, based on the received first information. The generated artefacts associated with the generated resource definition may correspond to the converted second information. The generated artefacts may be transmitted to the dataspace 108D. The set of usage policies associated with the dataspace 108D may be determined based on base-level details for the service agreement associated with the first node, received by the electronic device 102. The service agreement associated with the first node may be generated, based on the received base-level details and the determined set of usage policies. The usage policy may be created for the dataspace 108D based on the generated service agreement associated with the first node. A mapping may be generated between the generated service agreement associated with the first node and the created usage policy for the dataspace 108D. The created usage policy and the generated mapping may be transmitted to the dataspace 108D. The dataspace policy for the dataspace 108D may correspond to the transmitted usage policy and the transmitted mapping. The dataspace policy for the dataspace 108D may be used to convert the first information (that may be associated with a certain first data type, for example) to the second information (that may be associated with another second data type, for example).

At 406, the converted second information may be received by the MaaS node group 302B. The electronic device 102 may transmit the converted second information (i.e., converted from the first information) to the MaaS node group 302B. The second information (converted from the received first information) may be associated with an information security level, a size, a data type, and/or format that may be compliant with data storage requirements associated with the dataspace 108D.

At 408, the dataspace policy may be bound to the dataspace 108D to publish data to the dataspace 108D. The electronic device 102 may be configured to bind the dataspace policy to the dataspace 108D. The dataspace policy associated with the dataspace 108D may correspond to at least one of a type of data to be transmitted to the dataspace 108D or a set of conditions that may govern a transmission of data between nodes associated with the dataspace 108D. The electronic device 102 may determine an association between resources (e.g., incoming/received data (such as, the first information) and a usage policy associated with the dataspace 108D, based on an analysis of the service agreements associated with the first node 302A. Based on the determination of the association, the electronic device 102 may determine resources, artefacts, representations, contracts and the usage policy associated with the dataspace policy. The electronic device 102 may publish (i.e., transmit) the determined association for the dataspace policy to the dataspace 108D to bind the dataspace policy to the dataspace 108D. Thereafter, the electronic device 102 may publish (or transmit) the second information (converted from the received first information) to the dataspace 108D, based on the dataspace policy bound to the dataspace 108D.

Typically, there may be processes associated with storage of data policies and management of dataflow. As such, the storage of data policies, for example, the onboarding agreements and set of service and agreement templates can be cumbersome, as manual verification or authorization of the dataflow may be required to generate and maintain such data policies. For example, a user or a node may request information stored on another node of a MaaS network. The communication of the requested information may require prior audit of the usage policies. Such an audit may be done manually and thus may be prone to error and may be a laborious task.

On the contrary, the disclosed electronic device 102 may onboard a new node (e.g., the first node 302A) to a MaaS node group (e.g., the MaaS node group 302B) based on templatized service agreements and set of parameters. For example, the set of parameters and service agreement templates may be skeletal formats that may be generated for certain service agreements, usage policies etc. For example, if two organizations want to establish a revenue share service, they may have to establish a service agreement between them for revenue sharing. The templatized service agreements and the set of parameters may make the process of onboarding of the first node 302A to the MaaS network 100 (e.g., to the MaaS node group 302B) more streamlined and efficient. In an embodiment, the disclosed electronic device 102 may generate a dataspace policy for the dataspace 108D for management of data storage and dataflow for nodes of the MaaS network 100. Also, the electronic device 102 may convert the received first information associated with the first node 302A into the second information, which may be compliant to data storage and dataflow rules of the dataspace 108D. Thus, incoming data may be auto converted into a format that may be ingested by the dataspace 108D, based on the generated dataspace policy. The generated dataspace policy for the dataspace 108D can regulate the data flow. Thus, a standardized framework for data sharing among multiple parties may be established.

Figure 5:
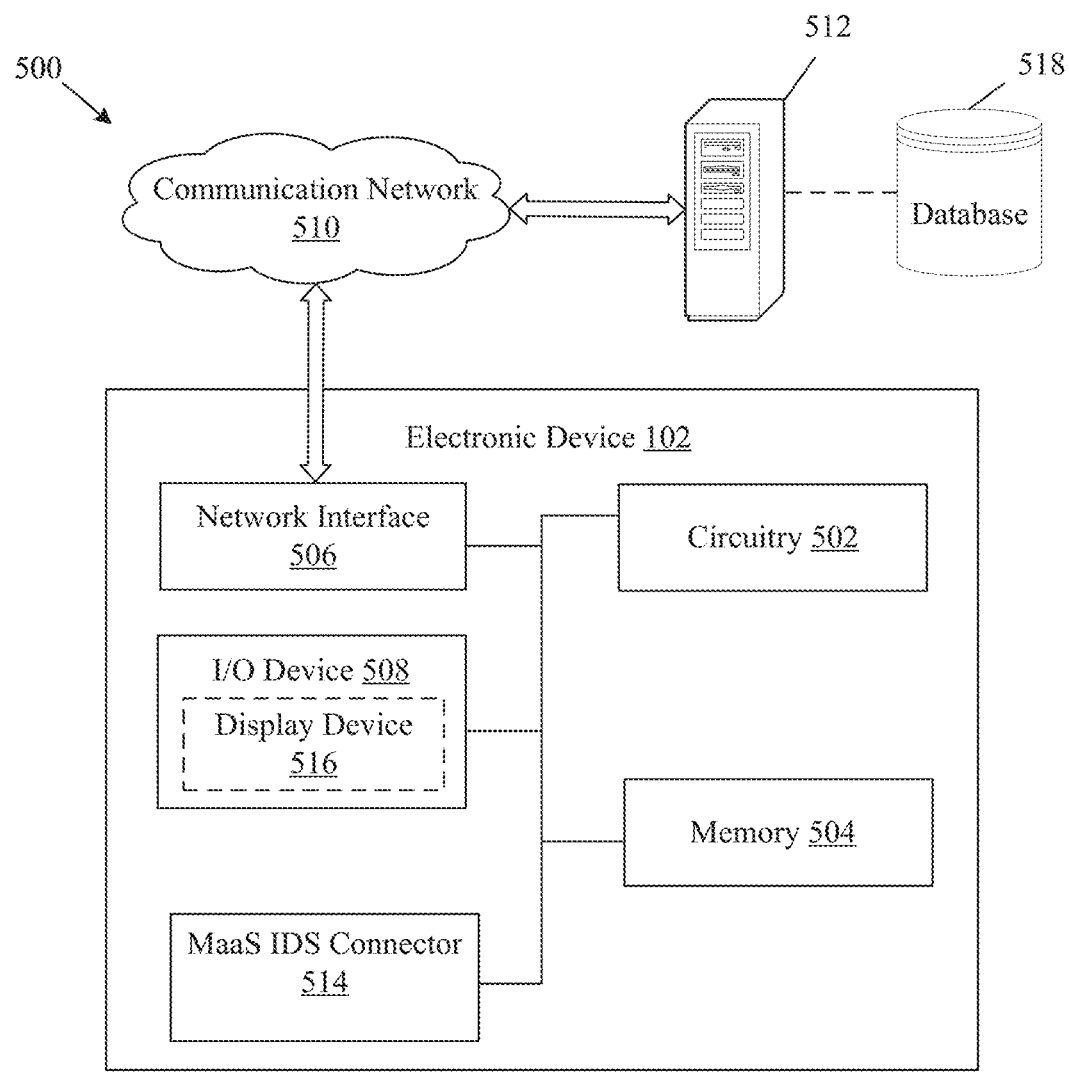
FIG. 5 is a block diagram that illustrates an exemplary electronic device of FIG. 1, in accordance with an embodiment of the disclosure.

FIG. 5 is a block diagram that illustrates an exemplary electronic device of FIG. 1, in accordance with an embodiment of the disclosure. FIG. 5 is explained in conjunction with elements from FIG. 1, FIG. 2, FIG. 3, and FIG. 4. With reference to FIG. 5, there is shown the exemplary electronic device 102. The electronic device 102 may include circuitry 502, a memory 504, a network interface 506, an input/output (I/O) device 508, and a MaaS dataspace connector 514. The input/output (I/O) device 508 may include a display device 516. The network interface 506 may connect the electronic device 102 with a database 518 (e.g., the first distributed ledger database 118 and/or the second distributed ledger database 120) through a server 512 (e.g., the MaaS platform 108), via a communication network 510.

The circuitry 502 may include suitable logic, circuitry, and/or interfaces that may be configured to execute program instructions associated with different operations to be executed by the electronic device 102. The operations may include reception of the onboarding request, verification of the DID, transmission of the set of parameters and the service agreement to the first node 302A, transmission of the service agreement to the MaaS node group 302B, generation of the dataspace policy, reception of the first information, conversion of the first information, and transmission of the second information. The circuitry 502 may include one or more processing units, which may be implemented as a separate processor. In an embodiment, the one or more processing units may be implemented as an integrated processor or a cluster of processors that perform the functions of the one or more specialized processing units, collectively. The circuitry 502 may be implemented based on a number of processor technologies known in the art. Examples of implementations of the circuitry 502 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 504 may include suitable logic, circuitry, interfaces, and/or code that may be configured to store one or more instructions to be executed by the circuitry 502. The one or more instructions stored in the memory 504 may execute different operations of the circuitry 502 (and/or the electronic device 102). The memory 504 may be configured to store information related to the set of nodes. Further, the memory 504 may store credential information and information related to the first set of MP nodes 104, the second set of MaaS player nodes 106, the MaaS platform 108, the issuer node 112, the set of holder nodes 114, the verifier node 116, the first distributed ledger database 118, and the second distributed ledger database 120. Examples of implementation of the memory 504 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 506 may include suitable logic, circuitry, interfaces, and/or code that may be configured to facilitate communication between the electronic device 102, the database 518 (e.g., the first distributed ledger database 118 and/or the second distributed ledger database 120) through the server 512 (e.g., the MaaS platform 108), via the communication network 510. The network interface 506 may be implemented by use of various known technologies to support wired or wireless communication of the electronic device 102 with the communication network 510. The network interface 506 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 506 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The I/O device 508 may include suitable logic, circuitry, interfaces, and/or code that may be configured to receive an input and provide an output based on the received input. For example, the I/O device 508 may receive an input indicative of the onboarding request of the first node 302A, credentials associated with the first node 302A or a user of the first node 302A, and/or the first information. The I/O device 508 may be further configured to display a user-interface associated with the onboarding of a node (e.g., the first node 302A) on the MaaS platform 108. The I/O device 508 may further display the set of parameters and the service agreement associated with the first node 302A, information related to the generated dataspace policy, and the second information. The I/O device 508 may include various input and output devices, which may be configured to communicate with the circuitry 502. The I/O device 508 may include the display device 516. Examples of the I/O device 508 may include, but are not limited to, a touch screen, the display device 516, a keyboard, a mouse, a joystick, a microphone, or a speaker. Examples of the I/O device 508 may further include braille I/O devices, such as braille keyboards, braille readers and the like.

The display device 516 may be a touch screen which may enable a user to provide a user-input via the display device 516. The touch screen may be at least one of a resistive touch screen, a capacitive touch screen, or a thermal touch screen. The display device 516 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 516 may refer to a display screen of a head mounted device (HMD), a smart-glass device, a see-through display, a projection-based display, an electro-chromic display, or a transparent display.

The MaaS dataspace connector 514 may include suitable logic, circuitry, and interfaces, and/or code that may be configured to connect the electronic device 102 to the dataspace 108D associated with the MaaS platform 108. The MaaS dataspace connector 514 may be used to extract, from the dataspace 108D, the usage policies and the set of conditions governing transmission of data between nodes associated with the dataspace 108D, and the various available resources. For example, the dataspace 108D may correspond to an International Data Space Association (IDSA) dataspace, a mobility dataspace, an automotive network dataspace, a Catena-X dataspace, a Gaia-X dataspace, and the like. The MaaS dataspace connector 514 may host the dataspace 108D on the MaaS platform 108 and/or the electronic device 102. Based on the usage policies and the set of conditions governing transmission of data, the integrity of data may be preserved, and also the generated dataspace policy of the dataspace 108D may be used to regulate the data flow. Thus, a standardized framework for data sharing among multiple parties may be established based on the dataspace 108D. The dataspace 108D may be connected to the electronic device 102 and the MaaS platform 108, through the MaaS dataspace connector 514. The dataspace is further explained, for example, in FIG. 2, FIG. 3, and FIG. 4.

The communication network 510 may include a communication medium through which the electronic device 102, the database 518 (e.g., the first distributed ledger database 118 and/or the second distributed ledger database 120) and the server 512 (e.g., the MaaS platform 108) may communicate with one another. The communication network 510 may be one of a wired connection or a wireless connection. Examples of the communication network 510 may include, but are not limited to, the Internet, a cloud network, Cellular or Wireless Mobile Network (such as Long-Term Evolution and 5th Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 510 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless point (AP), device to device communication, cellular communication protocols, and Bluetooth (BT) communication protocols.

The server 512 may include suitable logic, circuitry, and interfaces, and/or code that may be configured to manage the MaaS network 100. The server 512 may correspond to the MaaS platform 108 and may include the onboarding system 108A, the service catalog/agreement environment 108B, the system for travel history records/transaction settlement 108C, and the dataspace 108D. The dataspace 108D associated with the MaaS platform 108 (i.e., the server 512) may connect to the electronic device 102, through the MaaS dataspace connector 514. The MaaS platform is described further, for example, in FIG. 1. The dataspace is further explained, for example, in FIG. 2, FIG. 3, and FIG. 4.

The server 512 may be implemented as a cloud server and may execute operations through web applications, cloud applications, HTTP requests, repository operations, file transfer, and the like. Other example implementations of the server 512 may include, but are not limited to, a database server, a file server, a web server, a media server, an application server, a mainframe server, a machine learning server (enabled with or hosting, for example, a computing resource, a memory resource, and a networking resource), or a cloud computing server.

In at least one embodiment, the server 512 may be implemented as a plurality of distributed cloud-based resources by use of several technologies that are well known to those ordinarily skilled in the art. A person with ordinary skill in the art will understand that the scope of the disclosure may not be limited to the implementation of the server 512, the electronic device 102, as separate entities. In certain embodiments, the functionalities of the server 512 can be incorporated in its entirety or at least partially in the electronic device 102 without a departure from the scope of the disclosure. In certain embodiments, the server 512 may host the database 518. Alternatively, the server 512 may be separate from the database 518 and may be communicatively coupled to the database 518.

The database 518 may include suitable logic, interfaces, and/or code that may be configured to store data related to the first distributed ledger database 118 and/or the second distributed ledger database 120. For example, the database 518 may correspond to one of a plurality of nodes of the first distributed ledger database 118 and/or the second distributed ledger database 120. As an example, the database 518 may store credential information associated with the first node 302A. The credential information may be used to verify the DID associated with the first node 302A. In another example, the database 518 may store transaction records associated with a user and/or various entities (such as, the first set of MP nodes 104 and/or the second set of MaaS player nodes 106) with the MaaS platform 108. The database 518 may be derived from data off a relational or non-relational database, or a set of comma-separated values (csv) files in conventional or big-data storage. The database 518 may be stored or cached on a device, such as a server (e.g., the server 512) or the electronic device 102. The device storing the database 518 may be configured to receive a first request for credential information associated with the first node 302A (or a user of the first node 302A) or a second request associated with transaction records associated with the MaaS platform 108. In response, the device of the database 518 may be configured to transmit a first response (e.g., the credential information) or a second response (e.g., the transaction records) to the server 512 and/or the electronic device 102.

In some embodiments, the database 518 may be hosted on a plurality of servers stored at the same or distinct locations. The operations of the database 518 may be executed using hardware including a processor, a microprocessor (e.g., to perform or control performance of one or more operations), a field-programmable gate array (FPGA), or an application-specific integrated circuit (ASIC). In some other instances, the database 518 may be implemented using software. Various operations of the circuitry 502 for MaaS data sharing through a dataspace connector are described further, for example, in FIG. 1, FIG. 2, FIG. 3, and FIG. 4.

Figure 6:
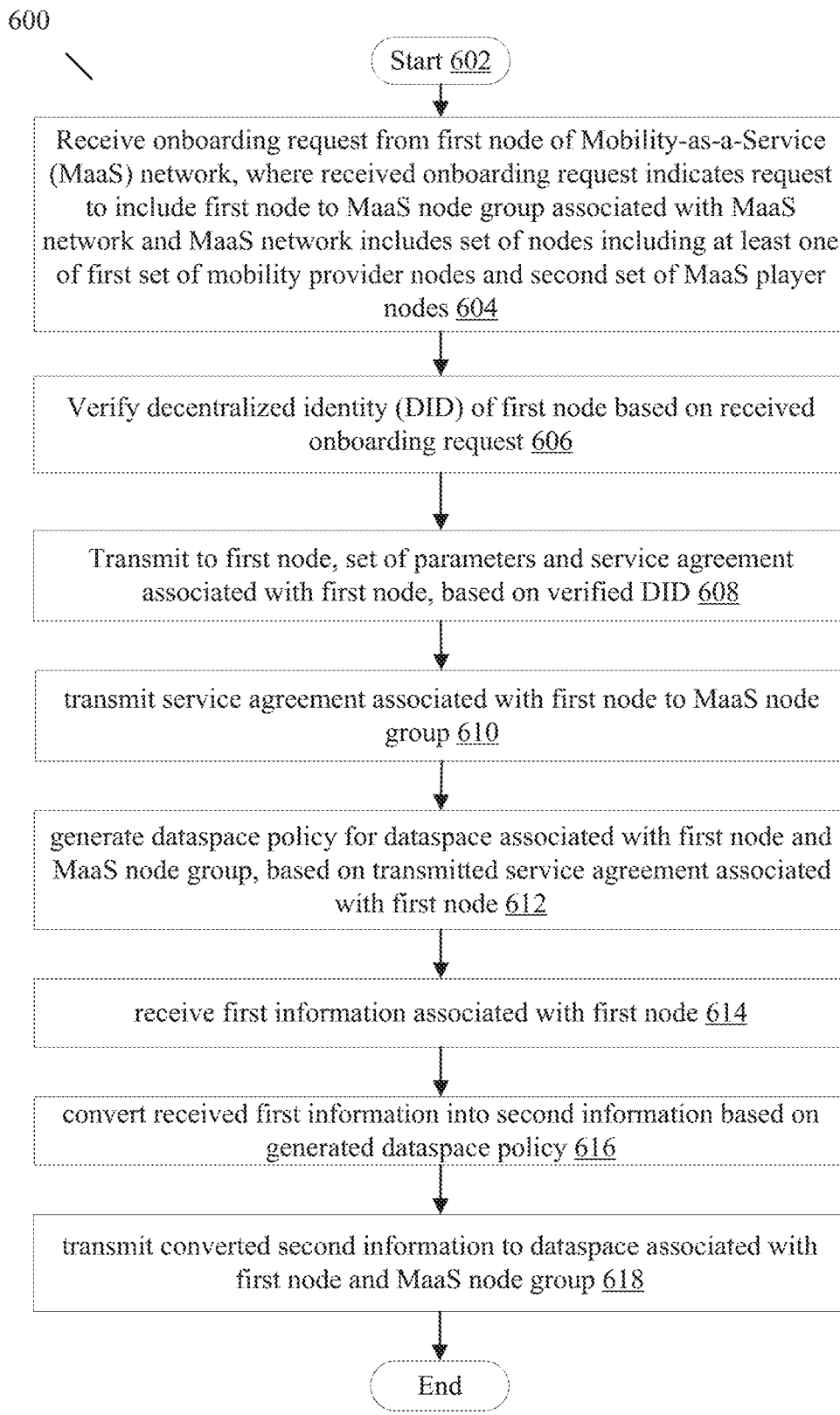
FIG. 6 is a flowchart that illustrates operations of an exemplary method for MaaS data sharing through a dataspace connector, in accordance with an embodiment of the disclosure.

FIG. 6 is a flowchart that illustrates operations of an exemplary method for MaaS data sharing through a dataspace connector, in accordance with an embodiment of the disclosure. FIG. 6 is described in conjunction with elements from FIG. 1, FIG. 2, FIG. 3, FIG. 4, and FIG. 5. With reference to FIG. 6, there is shown a flowchart 600. The exemplary method of the flowchart 600 may be executed by any computing system, for example, by the electronic device 102 of FIG. 1. The exemplary method of the flowchart 600 may start at 602 and proceed to 604.

At 604, the onboarding request may be received from the first node 302A of the MaaS network 100, wherein the received onboarding request may indicate the request to include the first node 302A to the MaaS node group 302B associated with MaaS network 100. Further, the MaaS network 100 includes a set of nodes including one of the first set of mobility provider nodes 104 and the second set of MaaS player nodes 106. The circuitry 502 of the electronic device 102 may be configured to receive an onboarding request from the first node 302A of the MaaS network 100. The received onboarding request may indicate a request to include the first node (for example, a node associated with a user, an organization, or personnel associated with the organization) to the MaaS node group 302B associated with the MaaS network 100. The MaaS network 100 may include a set of nodes including one of the first set of MP nodes 104 and the second set of MaaS player nodes 106. The first set of MP node 104 and the second set of MaaS player nodes 106 may be communicatively associated with the MaaS platform 108. The MaaS platform 108 may include the onboarding system 108A, service catalog or agreement environment 108B, travel history records/transaction settlement 108C, dataspace 108D. The reception of the onboarding request is described further, for example, in FIG. 2 (at 202).

At 606, the DID of the first node 302A may be verified based on the received onboarding request. The circuitry 502 may be configured to verify the DID of the first node 302A based on the received onboarding request. For example, by using DID and Self Sovereign Identity (SSI) of the first node, the electronic device 102 may verify the credentials of the first node 302A. It may be appreciated that by verification of the credentials of the first node 302A, an identity of a user or personnel associated with an organization associated with the first node 302A may be authenticated through a decentralized mechanism. Further, based on verification of the first node, information associated with the user, or the personnel associated with the organization may be stored at an identity provider (IDP). For example, based on a verification of the first node 302A, an access to the MaaS platform 108 may be granted to the user or the personnel associated with the organization. The verification of the DID of the first node is described further, for example, in FIG. 2 (at 204).

At 608, the set of parameters and the service agreement may be transmitted to the first node 302A, based on the verified DID. The circuitry 502 may be configured to transmit, to the first node 302A, the set of parameters and the service agreement associated with the first node 302A, based on the verified DID. The transmission of the set of parameters and the service agreement may be further based on transmission of the set of onboarding agreements, and the set of service and agreement templates to the MaaS node group 302B. For example, based on the granted access and the set of parameters, the service agreement associated with the first node 302A may be generated for the user or the personnel of the organization. The generation of the service agreement may be further based on the set of service and agreement templates generated by the MaaS community (e.g., the MaaS node group 302B). The transmission of the set of parameters and the service agreement to the first node is described further, for example, in FIG. 2 (at 206).

At 610, the service agreement associated with the first node 302A may be transmitted to the MaaS node group 302B. The circuitry 502 may be configured to transmit the service agreement associated with the first node 302A to the MaaS node group 302B. The transmission of the service agreement associated with the first node to the MaaS node group is described further, for example, in FIG. 2 (at 208).

At 612, the dataspace policy for the dataspace 108D associated with the first node 302A and the MaaS node group 302B may be generated, based on the transmitted service agreement associated with the first node 302A. The circuitry 502 may be configured to generate the dataspace policy for the dataspace 108D associated with the first node 302A and the MaaS node group 302B, based on the transmitted service agreement associated with the first node 302A. The dataspace 108D may store usage policies, set of conditions governing transmission of data between nodes associated with the dataspace 108D, and the various available resources. The dataspace policy may govern data usage and storage for information associated with the dataspace 108D. The dataspace policy may be based on a region or area of operation of a first MP, a first MaaS player, and/or a first MaaS network as a whole. The dataspace policy may also be dependent on one or more legal requirements of the region or area, which may change from time-to-time. In addition, data retention and processing rules may be governed by fine-grained parameters in a service agreement. The generation of the dataspace policy is described further, for example, in FIG. 2 (at 210).

At 614, the first information associated with the first node 302A may be received. The circuitry 502 of the electronic device 102 may be configured to receive the first information associated with the first node 302A. The first information may be either received from the first node 302A itself or from another node of the MaaS node group 302B. The received first information is converted to the second information based on the generated dataspace policy. The first information received from the first node may be for example revenue sharing from history, record history, information related to a subscription, General Data Protection Regulation (GDPR) compliant user auth (authentication), roaming auth (authentication), and so on. The first information may be converted to the second information based on the generated dataspace policy. The first information may be received post the onboarding of the first node 302A to the MaaS network 100 (including, for example, the MaaS node group 302B). The onboarding of the first node to the MaaS network is described further, for example, in FIG. 2 and FIG. 3. The onboarding agreements may include for example a master service agreement, terms-of-service agreement, or privacy policy agreement.

At 616, the received first information may be converted into the second information based on the generated dataspace policy. The circuitry 502 may be configured to convert the first information into the second information based on the generated dataspace policy. The dataspace policy for the dataspace 108D associated with the first node and the MaaS node group 302B may indicate one of a type of data to be transmitted to the dataspace 108D or a set of conditions that may govern a transmission of data between nodes associated with the dataspace. The dataspace policy may also be dependent on one or more legal requirements of the region or area, which may change from time-to-time. In addition, data retention and processing rules may be governed by fine-grained parameters in a service agreement. Examples of the fine-grained parameters may include data retention period, data analytics policy, a policy for data disclosure to third parties, treatment of personally identifiable information (PII), data hashing, and the like. The dataspace 108D may be used for storing policies associated with any of the record history, the information related to the subscription, the system for revenue sharing from history, the system for GDPR compliant user auth, the system for roaming auth, and the system for real-time analysis and recommendation. The conversion of the first information into the second information is described further, for example, in FIG. 2 (at 214).

At 618, the converted second information may be transmitted to dataspace 108D associated with the first node 302A and the MaaS node group 302B. The circuitry 502 of the electronic device 102 may be configured to transmit the second information (converted from the received first information) to the dataspace 108D associated with the first node 302A and the MaaS node group 302B. Control may pass to end.

Although the flowchart 600 is illustrated as discrete operations, such as, 604, 606, 608, 610, 612, 614, 616 and 618, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102). Such instructions may cause the electronic device 102 to perform operations that may include reception of an onboarding request from a first node of a MaaS network (e.g., the MaaS network 100). The received onboarding request may indicate a request to include the first node to a MaaS node group associated with the MaaS network 100. The MaaS network 100 may include a set of nodes including at least one of a first set of mobility provider (MP) nodes (e.g., the first set of mobility provider nodes 104) and a second set of MaaS player nodes (e.g., the second set of MaaS player nodes 106). The operations may further include verification of a decentralized identity (DID) of the first node based on the received onboarding request. The operations may further include transmission, to the first node, a set of parameters and a service agreement associated with the first node, based on the verified DID. The service agreement associated with the first node may be transmitted to the MaaS node group to generate a dataspace policy for a dataspace (e.g., the dataspace 108D) associated with the first node and the MaaS node group, based on the transmitted service agreement associated with the first node. The operations may further include reception of first information associated with the first node. The operations may further include conversion of the received first information into second information based on the generated dataspace policy. The operations may further include transmission of the converted second information to the dataspace 108D associated with the first node and the MaaS node group.

Various embodiments of the disclosure may provide an electronic device (for example, the electronic device 102). The electronic device 102 may include circuitry (e.g., the circuitry 502) and memory (e.g., the memory 504). The circuitry 502 of the electronic device 102 may be configured to receive an onboarding request from a first node of a MaaS network (e.g., the MaaS network 100). The received onboarding request may indicate a request to include the first node to a MaaS node group associated with the MaaS network 100. The MaaS network 100 may include a set of nodes including at least one of a first set of mobility provider (MP) nodes (e.g., the first set of mobility provider nodes 104) and a second set of MaaS player nodes (e.g., the second set of MaaS player nodes 106). Further, the circuitry 502 of the electronic device 102 may be configured to verify a decentralized identity (DID) of the first node based on the received onboarding request. The circuitry 502 of the electronic device 102 may be further configured to transmit, to the first node, a set of parameters and a service agreement associated with the first node, based on the verified DID. The service agreement associated with the first node may be transmitted to the MaaS node group to generate a dataspace policy for a dataspace (e.g., the dataspace 108D) associated with the first node and the MaaS node group, based on the transmitted service agreement associated with the first node. Further, the circuitry 502 of the electronic device 102 may be configured to receive first information associated with the first node. Further, the circuitry 502 of the electronic device 102 may be configured to convert the received first information into second information based on the generated dataspace policy. The circuitry 502 may be configured to transmit the converted second information to the dataspace 108D associated with the first node and the MaaS node group.

In an embodiment, the circuitry 502 may further be configured to create the MaaS node group associated with the MaaS network 100 and transmit a set of onboarding agreements and a set of service and agreement templates to the created MaaS node group.

In an embodiment, the transmission of the set of parameters and the service agreement associated with the first node to the first node may be further based on the transmitted set of onboarding agreements and the set of service and agreement templates.

In an embodiment, the set of onboarding agreements may correspond to one of a master service agreement, a terms-of-service agreement, or a privacy policy agreement.

In an embodiment, the MaaS network 100 may include one of an issuer node (e.g., the issuer node 112) associated with a credential issuing authority, a set of holder nodes (e.g., the set of holder nodes 114) corresponding to the set of nodes, a verifier node (e.g., the verifier node 116) associated with a MaaS network owner and a distributed ledger database (e.g., the second distributed ledger database 120).

In an embodiment, wherein each of the issuer node 112, the set of holder nodes 114, and the verifier node 116 may be associated with the distributed ledger database (e.g., the second distributed ledger database 120) and includes a corresponding DID agent.

In an embodiment, the issuer node 112 may be configured to generate credentials associated with each holder node of the set of holder nodes 114.

In an embodiment, the generated credentials may correspond to a set of attributes including one of an organization name, an organization ID, a name and electronic-mail ID of an administrator user, a role of a user of a node, or a user privilege level associated with a user of a node.

In an embodiment, the verifier node 116 may be configured to receive a credential verification request associated with the first node, based on the received onboarding request of the first node and query a holder node of the set of holder nodes 114 for verified credentials of the first node, based on the received credential verification request. The verified credentials of the first node is received based on the query and the DID of the first node is verified based on the received verified credentials of the first node.

In an embodiment, the circuitry 502 may further be configured to create a user and a role for the user, associated with the first node in the MaaS network and the creation of the user and the role is based on the verified DID of the first node and a scheduler.

In an embodiment, dataspace policy for the dataspace 108D associated with the first node and the MaaS node group 302B may indicate one of a type of data to be transmitted to the dataspace 108D or a set of conditions governing transmission of data between nodes associated with the dataspace.

In an embodiment, the circuitry 502 may further be configured to receive base-level details for the service agreement associated with the first node and generate catalog information and offer information based on the received base-level details. A mapping may be generated between the generated catalog information and the offer information and generate a resource definition associated with the dataspace 108D based on the generated mapping and the generated dataspace policy for the dataspace 108D. Further, the circuitry 502 may generate a resource definition associated with the dataspace 108D based on the generated mapping and the generated dataspace policy for the dataspace 108D and generate artefacts associated with the generated resource definition, based on the received first information. The generated artefacts associated with the generated resource definition may correspond to the converted second information and transmit the generated artefacts to the dataspace.

In an embodiment, the circuitry 502 may further be configured to determine a set of usage policies associated with the dataspace 108D and receive base-level details for the service agreement associated with the first node. Further, the circuitry 502 may generate the service agreement associated with the first node, based on the received base-level details and the determined set of usage policies. The circuitry 502 may be configured to create a usage policy for the dataspace 108D based on the generated service agreement associated with the first node. Furthermore, the circuitry 502 may generate a mapping between the generated service agreement associated with the first node and the created usage policy for the dataspace 108D to transmit the created usage policy and the generated mapping to the dataspace 108D. the dataspace policy for the dataspace 108D may correspond to the transmitted usage policy and the transmitted mapping.

In an embodiment, the circuitry 502 may further be configured to establish a connection with a metadata broker associated with the MaaS network 100. The circuitry 502 may transmit, to the metadata broker based on the established connection, the third information indicative of resources available through the dataspace 108D and fourth information indicative of a usage policy of the dataspace. The circuitry 502 may further be configured to transmit, to the metadata broker, a uniform resource identifier (URI) associated with each resource of the resources available through the dataspace 108D and the resources are accessible through the URI.

In an embodiment, the circuitry 502 may further be configured to receive an access request for a resource of resources available through the dataspace 108D and determine a uniform resource identifier (URI) associated with the resource requested in the received access request. The circuitry 502 may further be configured to determine whether an access to the determined URI conforms to a usage policy associated with the dataspace 108D. The circuitry 502 may transmit the determined URI associated with the resource requested in the received access request, based on the determination that the access to the determined URI conforms to the usage policy associated with the dataspace.

The circuitry 502 may further be configured to render the determined URI as inaccessible based on the determination that the access to the determined URI is non-conformant to the usage policy associated with the dataspace.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive an onboarding request from a first node of a Mobility-as-a-Service (MaaS) network, wherein
      the received onboarding request indicates a request to include the first node to a MaaS node group associated with the MaaS network, and
      the MaaS network includes a set of nodes including at least one of a first set of mobility provider nodes and a second set of MaaS player nodes;
   verify a decentralized identity (DID) of the first node based on the received onboarding request;
   transmit, to the first node, a set of parameters and a service agreement associated with the first node, based on the verified DID;
   transmit the service agreement associated with the first node to the MaaS node group;
   generate a dataspace policy for a dataspace associated with the first node and the MaaS node group, based on the transmitted service agreement associated with the first node;
   receive first information associated with the first node;
   convert the received first information into second information based on the generated dataspace policy; and transmit the converted second information to the dataspace associated with the first node and the MaaS node group.

2. The electronic device according to claim 1, wherein the circuitry is further configured to:
create the MaaS node group associated with the MaaS network; and
transmit a set of onboarding agreements and a set of service and agreement templates to the created MaaS node group.

3. The electronic device according to claim 2, wherein the transmission of the set of parameters and the service agreement associated with the first node to the first node are further based on the transmitted set of onboarding agreements and the set of service and agreement templates.

4. The electronic device according to claim 2, wherein the set of onboarding agreements corresponds to at least one of:
a master service agreement,
a terms-of-service agreement, or
a privacy policy agreement.

5. The electronic device according to claim 1, wherein the MaaS network includes at least one of:
an issuer node associated with a credential issuing authority,
a set of holder nodes corresponding to the set of nodes,
a verifier node associated with a MaaS network owner, and
a distributed ledger database.

6. The electronic device according to claim 5, wherein each of the issuer node, the set of holder nodes, and the verifier node is associated with the distributed ledger database and includes a corresponding DID agent.

7. The electronic device according to claim 5, wherein the issuer node is configured to generate credentials associated with each holder node of the set of holder nodes.

8. The electronic device according to claim 7, wherein the generated credentials correspond to a set of attributes including at least one of:
an organization name,
an organization ID,
a name and electronic-mail ID of an administrator user,
a role of a user of a node, or
a user privilege level associated with a user of a node.

9. The electronic device according to claim 5, wherein the verifier node is configured to:
receive a credential verification request associated with the first node, based on the received onboarding request of the first node;
query a holder node of the set of holder nodes for verified credentials of the first node, based on the received credential verification request; and
receive, from the holder node, the verified credentials of the first node, based on the query, wherein
the DID of the first node is verified based on the received verified credentials of the first node.

10. The electronic device according to claim 1, wherein the circuitry is further configured to:
create a user and a role for the user, associated with the first node in the MaaS network, wherein
the creation of the user and the role is based on the verified DID of the first node and a scheduler.

11. The electronic device according to claim 1, wherein dataspace policy for the dataspace associated with the first node and the MaaS node group indicates at least one of:
a type of data to be transmitted to the dataspace, or
a set of conditions governing transmission of data between nodes associated with the dataspace.

12. The electronic device according to claim 1, wherein the circuitry is further configured to:
receive base-level details for the service agreement associated with the first node;
generate catalog information and offer information based on the received base-level details;
generate a mapping between the generated catalog information and the offer information;
generate a resource definition associated with the dataspace based on the generated mapping and the generated dataspace policy for the dataspace;
generate artefacts associated with the generated resource definition, based on the received first information, wherein
the generated artefacts associated with the generated resource definition correspond to the converted second information; and
transmit the generated artefacts to the dataspace.

13. The electronic device according to claim 1, wherein the circuitry is further configured to:
determine a set of usage policies associated with the dataspace;
receive base-level details for the service agreement associated with the first node;
generate the service agreement associated with the first node, based on the received base-level details and the determined set of usage policies;
create a usage policy for the dataspace based on the generated service agreement associated with the first node;
generate a mapping between the generated service agreement associated with the first node and the created usage policy for the dataspace; and
transmit the created usage policy and the generated mapping to the dataspace, wherein
the dataspace policy for the dataspace corresponds to the transmitted usage policy and the transmitted mapping.

14. The electronic device according to claim 1, wherein the circuitry is further configured to:
establish a connection with a metadata broker associated with the MaaS network;
transmit, to the metadata broker based on the established connection, third information indicative of resources available through the dataspace and fourth information indicative of a usage policy of the dataspace; and
transmit, to the metadata broker, a uniform resource identifier (URI) associated with each resource of the resources available through the dataspace, wherein
the resources are accessible through the URI.

15. The electronic device according to claim 1, wherein the circuitry is further configured to:
receive an access request for a resource of resources available through the dataspace;
determine a uniform resource identifier (URI) associated with the resource requested in the received access request;
determine whether an access to the determined URI conforms to a usage policy associated with the dataspace;
transmit the determined URI associated with the resource requested in the received access request, based on the determination that the access to the determined URI conforms to the usage policy associated with the dataspace; and render the determined URI as inaccessible based on the determination that the access to the determined URI is non-conformant to the usage policy associated with the dataspace.

16. A method, comprising:

in an electronic device:
receiving an onboarding request from a first node of a Mobility-as-a-Service (MaaS) network, wherein
the received onboarding request indicates a request to include the first node to a MaaS node group associated with the MaaS network, and
the MaaS network includes a set of nodes including at least one of a first set of mobility provider nodes and a second set of MaaS player nodes;
verifying a decentralized identity (DID) of the first node based on the received onboarding request;
transmitting, to the first node, a set of parameters and a service agreement associated with the first node, based on the verified DID;
transmitting the service agreement associated with the first node to the MaaS node group;
generating a dataspace policy for a dataspace associated with the first node and the MaaS node group, based on the transmitted service agreement associated with the first node;
receiving first information associated with the first node;
converting the received first information into second information based on the generated dataspace policy; and
transmitting the converted second information to the dataspace associated with the first node and the MaaS node group.

17. The method according to claim 16, further comprising:
creating the MaaS node group associated with the MaaS network; and
transmitting a set of onboarding agreements and a set of service and agreement templates to the created MaaS node group.

18. The method according to claim 17, wherein the transmission of the set of parameters and the service agreement associated with the first node to the first node are further based on the transmitted set of onboarding agreements and the set of service and agreement templates.

19. The method according to claim 17, wherein the set of onboarding agreements corresponds to at least one of:
a master service agreement,
a terms-of-service agreement, or
a privacy policy agreement.

20. A non-transitory computer-readable medium having stored thereon, computer-executable instructions that when executed by an electronic device, causes the electronic device to execute operations, the operations comprising:
receiving an onboarding request from a first node of a Mobility-as-a-Service (MaaS) network, wherein
the received onboarding request indicates a request to include the first node to a MaaS node group associated with the MaaS network, and
the MaaS network includes a set of nodes including at least one of a first set of mobility provider nodes and a second set of MaaS player nodes;
verifying a decentralized identity (DID) of the first node based on the received onboarding request;
transmitting, to the first node, a set of parameters and a service agreement associated with the first node, based on the verified DID;
transmitting the service agreement associated with the first node to the MaaS node group;
generating a dataspace policy for a dataspace associated with the first node and the MaaS node group, based on the transmitted service agreement associated with the first node;
receiving first information associated with the first node;
converting the received first information into second information based on the generated dataspace policy; and
transmitting the converted second information to the dataspace associated with the first node and the MaaS node group.

* * * * *